(12) United States Patent
Goto et al.

(10) Patent No.: US 8,778,554 B2
(45) Date of Patent: Jul. 15, 2014

(54) FUEL CELL

(75) Inventors: Shuhei Goto, Utsunomiya (JP);
Narutoshi Sugita, Utsunomiya (JP);
Kentaro Ishida, Utsunomiya (JP);
Tetsuya Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 13/495,055

(22) Filed: Jun. 13, 2012

(65) Prior Publication Data

US 2012/0321987 A1 Dec. 20, 2012

(30) Foreign Application Priority Data

Jun. 16, 2011 (JP) .................................. 2011-134433
May 21, 2012 (JP) .................................. 2012-115261

(51) Int. Cl.
*H01M 8/24* (2006.01)

(52) U.S. Cl.
USPC ............................. 429/457; 429/456; 429/514

(58) Field of Classification Search
None
See application file for complete search history.

(56) References Cited

U.S. PATENT DOCUMENTS

2007/0184327 A1* 8/2007 Ishioka et al. .................. 429/35
2008/0292941 A1 11/2008 Oda et al.

FOREIGN PATENT DOCUMENTS

| JP | 10-134833 A | 5/1998 |
|---|---|---|
| JP | 10-302813 A | 11/1998 |
| JP | 11-283637 A | 10/1999 |
| JP | 2003-132911 A | 5/2003 |
| JP | 2004-185939 A | 7/2004 |
| JP | 2005-268110 A | 9/2005 |
| JP | 2007-213971 A | 8/2007 |
| JP | 2008-293758 A | 12/2008 |
| JP | 2009-026476 A | 2/2009 |
| JP | 2010-182515 A | 8/2010 |

* cited by examiner

*Primary Examiner* — Cynthia K. Walls
(74) *Attorney, Agent, or Firm* — Carrier Blackman & Associates, P.C.; Joseph P. Carrier; Michael J. McCandlish

(57) ABSTRACT

A fuel cell includes a membrane electrode assembly, and a first separator and a second separator sandwiching the membrane electrode assembly. The membrane electrode assembly has a resin frame member, and an inlet buffer is provided on the resin frame member adjacent to the fuel gas supply passage. The inlet buffer includes a first buffer area adjacent to the fuel gas supply passage and a second buffer area adjacent to a fuel gas flow field. The opening dimension of the first buffer area in a stacking direction is larger than the opening dimension of the second buffer area in the stacking direction.

8 Claims, 18 Drawing Sheets

FUEL CELL

CROSS-REFERENCE TO RELATED APPLICATION

This application is based upon and claims the benefit of priority from Japanese Patent Applications No. 2011-134433 filed on Jun. 16, 2011 and No. 2012-115261 filed on May 21, 2012, of which the contents are incorporated herein by reference.

BACKGROUND OF THE INVENTION

1. Field of the Invention

The present invention relates to a fuel cell including a membrane electrode assembly and separators sandwiching the membrane electrode assembly. The membrane electrode assembly includes a pair of electrodes and an electrolyte membrane interposed between the electrodes. A first reactant gas flow field is formed in the fuel cell for supplying one reactant gas along one electrode surface of the membrane electrode assembly, and a second reactant gas flow field is formed in the fuel cell for supplying the other reactant gas to the other electrode surface of the membrane electrode assembly.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly is sandwiched between separators to form a power generation cell (unit cell). Generally, several tens to hundreds of unit cells are stacked together to from a fuel cell stack for use in a vehicle.

In most cases, in order to supply a fuel gas and an oxygen-containing gas as reactant gases to the anode and the cathode of each of the stacked power generation cells, the fuel cell has so called internal manifold structure. The internal manifold includes reactant gas supply passages and reactant gas discharge passages extending through the power generation cells in the stacking direction. The reactant gas supply passages and the reactant gas discharge passages are connected to inlets and outlets of reactant gas flow fields for supplying reactant gases along electrode surfaces.

In this case, the opening areas of the reactant gas supply passages and the recant gas discharge passages are relatively small. Therefore, in order to enable such reactant gases to flow in the reactant gas flow fields smoothly, buffers for dispersing the reactant gases are required to be provided adjacent to the reactant gas supply passages and the reactant gas discharge passages.

For example, in a fuel cell disclosed in Japanese Laid-Open Patent Publication No. 11-283637 (hereinafter referred to as conventional technique 1), as shown in FIG. 18, a plate body 1 is provided. On both sides of both ends of the body 1, a first through hole 2a, a second through hole 3a, a third through hole 4a as supply passages of a hydrogen gas, an oxygen gas, and coolant water, and first through hole 2b, a second through hole 3b, and a third through hole 4b as discharge passages of the hydrogen gas, the oxygen gas, and, and the coolant water are formed.

A hydrogen gas flow field 5 is formed at a central portion of the body 1. The hydrogen gas flow field 5 is connected to the first through hole 2a and the first through hole 2b for allowing the hydrogen gas to flow from the first through hole 2a to the hydrogen gas flow field 5, and flow from the hydrogen gas flow field 5 to the first through hole 2b. A fin-like guides 6 for guiding the hydrogen gas from the first through hole 2a to the hydrogen gas flow field 5, and a fin-like guides 7 for guiding the hydrogen gas from the hydrogen gas flow field 5 to the first through hole 2b are provided in portions of the body 1 which are in contact with the hydrogen gas.

SUMMARY OF THE INVENTION

In the above conventional technique 1, in order to guide the hydrogen gas, the fin-like guides 6, 7 are used. However, in comparison with the width of the hydrogen gas flow field 5 in the X direction, the openings of the first through holes 2a, 2b are considerably small. In the structure, it is not possible to supply the hydrogen gas uniformly over the width direction of the hydrogen gas flow field 5 through the guides 6, 7 disadvantageously.

The present invention has been made to solve the problems of this type, and an object of the present invention is to provide a fuel cell which makes it possible to supply a reactant gas uniformly and reliably to the entire reactant gas flow field through a buffer from a reactant gas passage, and maintain a desired power generation performance with simple structure.

The present invention relates to a fuel cell including a membrane electrode assembly and separators sandwiching the membrane electrode assembly. The membrane electrode assembly includes a pair of electrodes and an electrolyte membrane interposed between the electrodes. A first reactant gas flow field is formed in the fuel cell for supplying one reactant gas along one electrode surface of the membrane electrode assembly, and a second reactant gas flow field is formed in the fuel cell for supplying the other reactant gas along the other electrode surface of the membrane electrode assembly.

A first reactant gas passage is formed for supplying the one reactant gas in the stacking direction of the fuel cell and a second reactant gas passage is formed for supplying the other reactant gas in the stacking direction. A buffer connecting the first reactant gas passage and the first reactant gas flow field is provided at least on one surface of the membrane electrode assembly.

The buffer includes a first buffer area adjacent to the first reactant gas passage and a second buffer area adjacent to the first reactant gas flow field. The opening dimension of the first buffer area in the stacking direction is larger than the opening dimension of the second buffer area in the stacking direction.

In the present invention, the opening dimension of the first buffer area adjacent to the first reactant gas passage is larger than the opening dimension of the second buffer area adjacent to the first reactant gas flow field. In the structure, the reactant gas can be distributed suitably in the first buffer area.

Therefore, for example, after one of the reactant gases supplied from the first reactant gas supply passage (first reactant gas passage) to the first inlet buffer (buffer) is distributed uniformly in the first buffer area, the reactant gas flows along the second buffer area, and the reactant gas is supplied to the first reactant gas flow field.

In the structure, the reactant gas is supplied from the first reactant gas passage through the buffer to the entire reactant gas flow field uniformly and reliably. With such a simple structure, a desired power generation performance can be maintained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
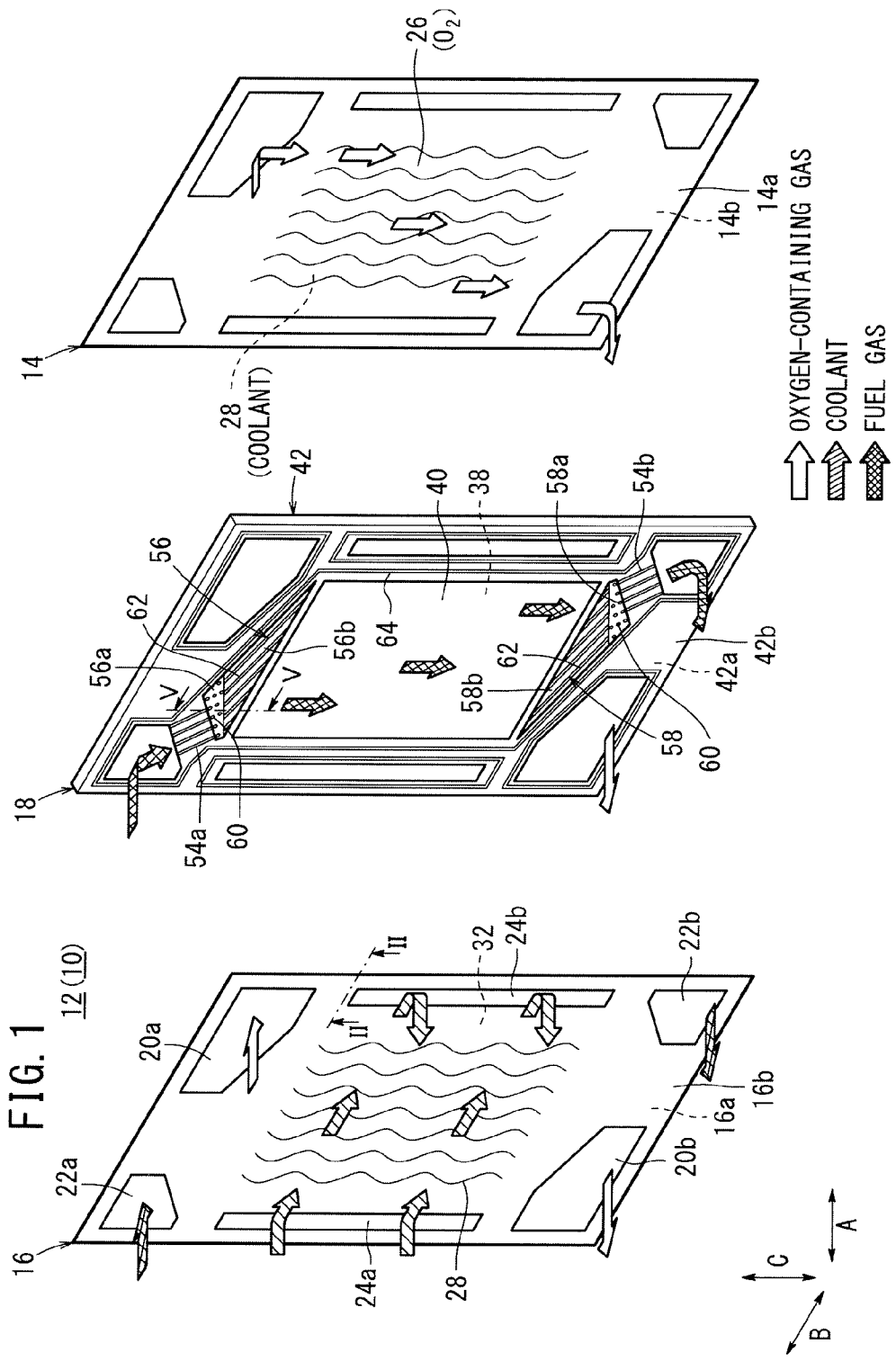
FIG. 1 is an exploded perspective view showing a cell unit of a fuel cell according to a first embodiment of the present invention.
Figure 2:
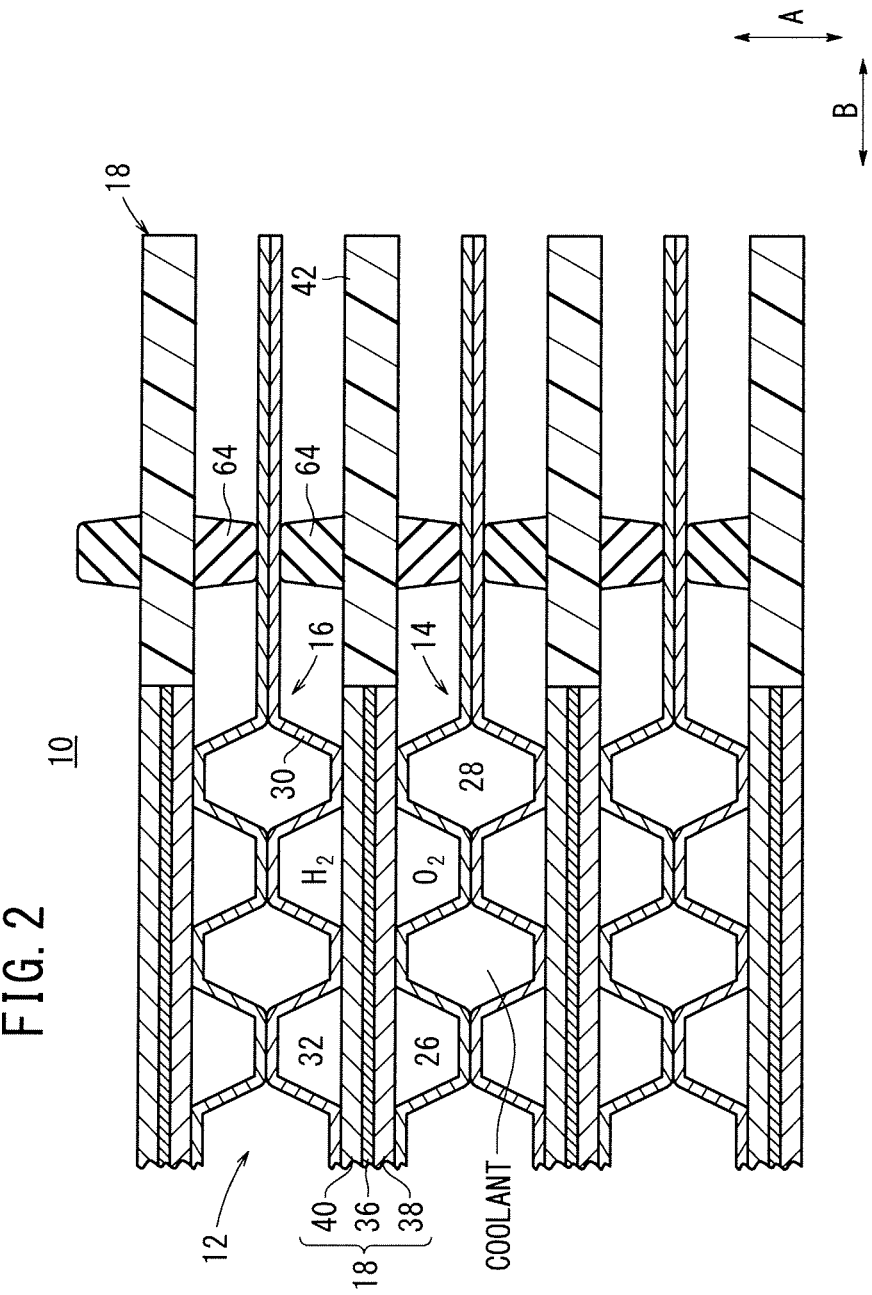
FIG. 2 is a cross sectional view showing the cell unit, taken along a line II-II in FIG. 1.

As shown in FIGS. 1 and 2, a fuel cell 10 according to a first embodiment of the present invention is formed by stacking a plurality of cell units (power generation cells) 12 in a horizontal direction indicated by an arrow A or in a direction of gravity indicated by an arrow C. For example, the fuel cell 10 is used as a fuel cell stack mounted in a vehicle.

The cell unit 12 includes a membrane electrode assembly (MEA) 18, and a first separator 14 and a second separator 16 sandwiching the membrane electrode assembly 18. At an upper end of the cell unit 12 in a longitudinal direction thereof indicated by the arrow C, an oxygen-containing gas supply passage (first reactant gas passage) 20a for supplying an oxygen-containing gas (air, etc.) (one reactant gas) and a fuel gas supply passage (second reactant gas passage) 22a for supplying a fuel gas (the other reactant gas) such as a hydrogen-containing gas (a hydrogen gas, etc.) are provided. The oxygen-containing gas supply passage 20a and the fuel gas supply passage 22a extend through the cell unit 12 in the direction indicated by the arrow A.

At a lower end of the cell unit 12 in the longitudinal direction indicated by the arrow C, a fuel gas discharge passage (second reactant gas passage) 22b for discharging a fuel gas, and an oxygen-containing gas discharge passage (first reactant gas passage) 20b for discharging the oxygen-containing gas are provided. The fuel gas discharge passage 22b and the oxygen-containing gas discharge passage 20b extend through the cell unit 12 in the direction indicated by the arrow A.

At one end of the cell unit 12 in the lateral direction indicated by an arrow B, a coolant supply passage 24a for supplying a coolant is provided, and at the other end of the cell unit 12 in the lateral direction, a coolant discharge passage 24b for discharging the coolant is provided. The coolant supply passage 24a and the coolant discharge passage 24b extend through the cell unit 12 in the direction indicated by the arrow A.

For example, the first separator 14 and the second separator 16 are metal plates such as steel plates, stainless steel plates, aluminum plates, plated steel sheets, or metal plates having anti-corrosive surfaces by surface treatment. The first separator 14 and the second separator 16 have ridges and grooves in cross section by corrugating metal thin plates under pressure. Instead of the metal separators, for example, carbon separators may be used as the first separator 14 and the second separator 16.

The first separator 14 has an oxygen-containing gas flow field (first reactant gas flow field) 26 on its surface 14a facing the membrane electrode assembly 18. The oxygen-containing gas flow field 26 connects the oxygen-containing gas supply passage 20a and the oxygen-containing gas discharge passage 20b. The oxygen-containing gas flow field 26 includes a plurality of wavy flow grooves extending in the direction indicated by the arrow C. A surface 14b of the first separator 14 forms part of a coolant flow field 28 connecting the coolant supply passage 24a and the coolant discharge passage 24b. The coolant flow field 28 is formed by overlapping the back surface of the oxygen-containing gas flow field 26 and the back surface of a fuel gas flow field (second reactant gas flow field) 32 to be described later.

The second separator 16 has the fuel gas flow field 32 on its surface 16a facing the membrane electrode assembly 18. The fuel gas flow field 32 connects the fuel gas supply passage 22a and the fuel gas discharge passage 22b. The fuel gas flow field 32 includes a plurality of wavy flow grooves extending in the direction indicated by the arrow C. A surface 16b of the second separator 16 forms part of the coolant flow field 28 connecting the coolant supply passage 24a and the coolant discharge passage 24b.

As necessary, seal members (not shown) may be provided on both surfaces 14a, 14b of the first separator 14 and on both surfaces 16a, 16b of the second separator 16.

As shown in FIG. 2, the membrane electrode assembly 18 includes a cathode 38, an anode 40, and a solid polymer electrolyte membrane 36 interposed between the cathode 38 and the anode 40. The solid polymer electrolyte membrane 36 is formed by impregnating a thin membrane of perfluorosulfonic acid with water, for example. Each of the cathode 38 and the anode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 38 and the electrode catalyst layer of the anode 40 are fixed to both surfaces of the solid polymer electrolyte membrane 36, respectively.

The surface area of the solid polymer electrolyte membrane 36 is the same as the surface area of the cathode 38 and the surface area of the anode 40, or larger than the surface area of the cathode 38 and the surface area of the anode 40. A resin frame member (frame) 42 is formed integrally with the outer circumferential end of the solid polymer electrolyte membrane 36, e.g., by injection molding. As the resin material, for example, in addition to general purpose plastic, engineering plastic, super engineering plastic or the like is adopted.

Figure 3:
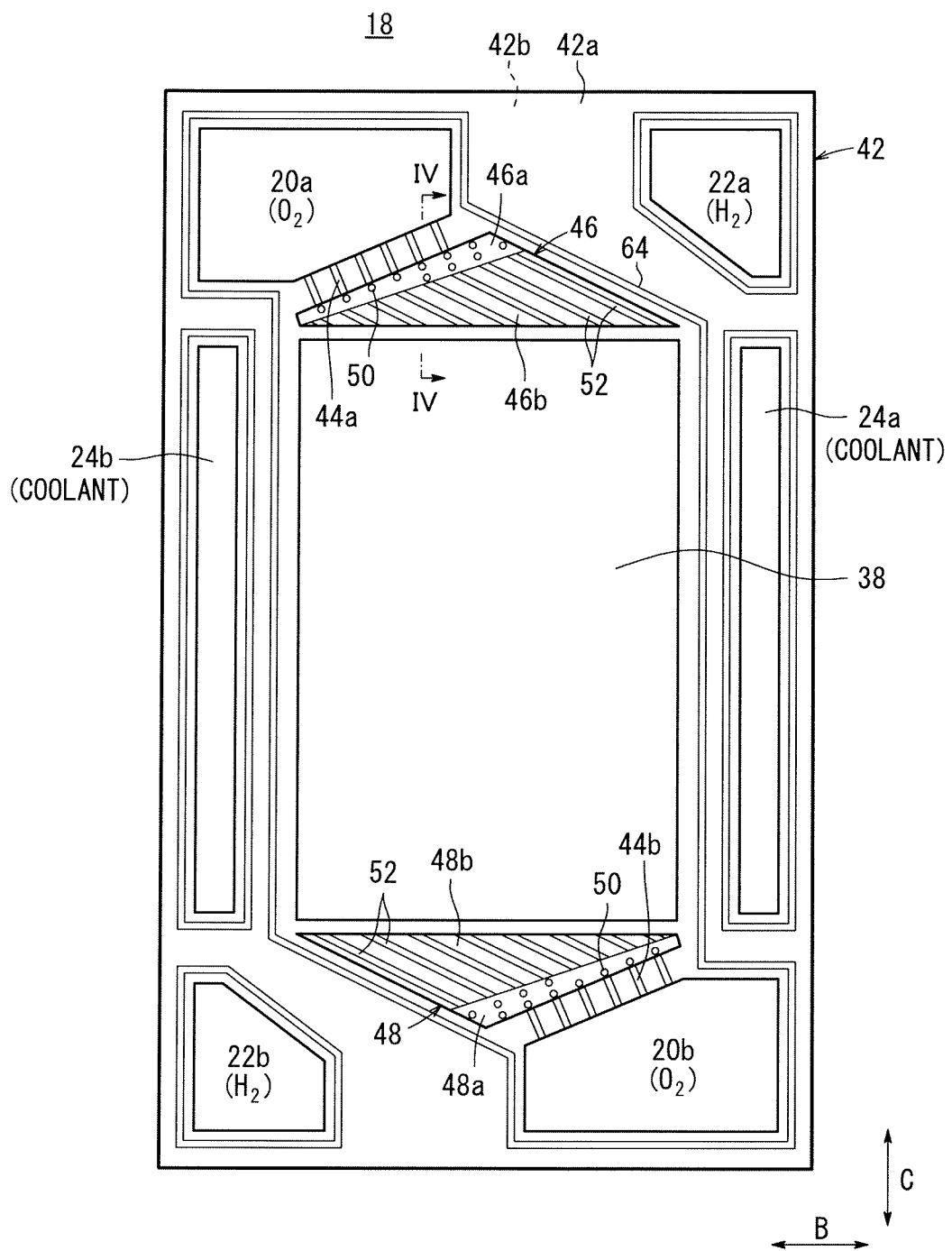
FIG. 3 is a front view showing a membrane electrode assembly of the cell unit.

As shown in FIGS. 1 and 3, the oxygen-containing gas supply passage 20a, the fuel gas supply passage 22a, the coolant supply passage 24a, the oxygen-containing gas discharge passage 20b, and the fuel gas discharge passage 22b, and the coolant discharge passage 24b are formed in the resin frame member 42 of the membrane electrode assembly 18.

As shown in FIG. 3, a plurality of inlet connection grooves 44a and a plurality of outlet connection grooves 44b are formed on a surface (one surface) 42a of the resin frame member 42 where the cathode 38 is provided. The inlet connection grooves 44a are connected to the oxygen-containing gas supply passage 20a at one end, and connected to the inlet buffer 46 at the other end. The outlet connection grooves 44b are connected to the oxygen-containing gas discharge passage 20b at the one end, and connected to the outlet buffer 48 at the other end.

The inlet buffer 46 connects the oxygen-containing gas supply passage 20a and the oxygen-containing gas flow field 26, and the outlet buffer 48 connects the oxygen-containing gas flow field 26 and the oxygen-containing gas discharge passage 20b.

The inlet buffer 46 has a substantially triangular shape, and includes a first buffer area 46a adjacent to the oxygen-containing gas supply passage 20a and a second buffer area 46b adjacent to the oxygen-containing gas flow field 26. The first buffer area 46a is in parallel to the inner end surface of the oxygen-containing gas supply passage 20a. The first buffer area 46a is elongated in the direction in which the inlet connection grooves 44a are arranged.

Figure 4:
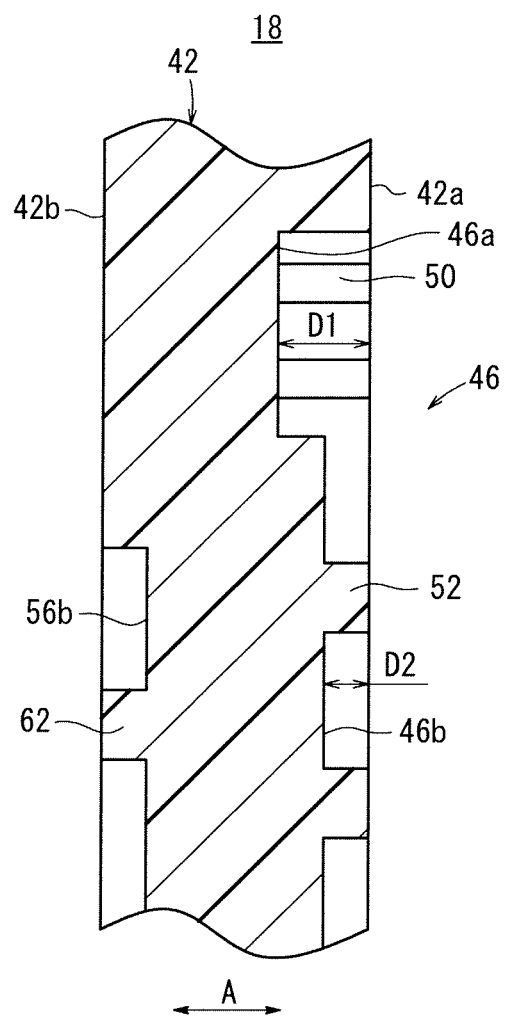
FIG. 4 is a cross sectional view showing a resin frame member provided in the membrane electrode assembly, taken along a line IV-IV in FIG. 3.

As shown in FIG. 4, the depth (the opening dimension) D1 of the first buffer area 46a from the surface 42a in the stacking direction indicated by the arrow A is larger than the depth (the opening dimension) D2 of the second buffer area 46b in the stacking direction, i.e., the grooves of the first buffer area 46a are deeper than the grooves of the second buffer area 46b (D1>D2). Bosses 50 are formed in the first buffer area 46a, and a plurality of guides 52 connecting the first buffer area 46a and the oxygen-containing gas flow field 26 continuously are provided in the second buffer area 46b. As shown in FIG. 3, the guides 52 are thin plates that are arranged in parallel to each other substantially at equal intervals in the width direction of the oxygen-containing gas flow field 26 indicated by the arrow B.

The outlet buffer 48 has a substantially triangular shape, and includes a first buffer area 48a adjacent to the oxygen-containing gas discharge passage 20b and a second buffer area 48b adjacent to the oxygen-containing gas flow field 26. The first buffer area 48a is in parallel to the inner end surface of the oxygen-containing gas discharge passage 20b. The first buffer area 48a is elongated in the direction in which the outlet connection grooves 44b are arranged.

The grooves of the first buffer area 48a are deeper than the grooves of the second buffer area 48b. Bosses 50 are formed in the first buffer area 48a, and a plurality of guides 52 connecting the first buffer area 48a and the oxygen-containing gas flow field 26 continuously are provided in the second buffer area 48b.

As shown in FIG. 1, a plurality of inlet connection grooves 54a and a plurality of outlet connection grooves 54b are formed on a surface (the other surface) 42b of the resin frame member 42 where the anode 40 is provided. The inlet connection grooves 54a are connected to the fuel gas supply passage 22a at one end, and connected to the inlet buffer 56 at the other end. The outlet connection grooves 54b are connected to the fuel gas discharge passage 22b at one end, and connected to the outlet buffer 58 at the other end.

The inlet buffer 56 connects the fuel gas supply passage 22a and the fuel gas flow field 32. The outlet buffer 58 connects the fuel gas flow field 32 and the fuel gas discharge passage 22b.

The inlet buffer 56 has a substantially triangular shape, and includes a first buffer area (third buffer area) 56a adjacent to the fuel gas supply passage 22a and a second buffer area (fourth buffer area) 56b adjacent to the fuel gas flow field 32. The first buffer area 56a is in parallel to the inner end surface of the fuel gas supply passage 22a. The first buffer area 56a is elongated in the direction in which the inlet connection grooves 54a are arranged.

Figure 5:
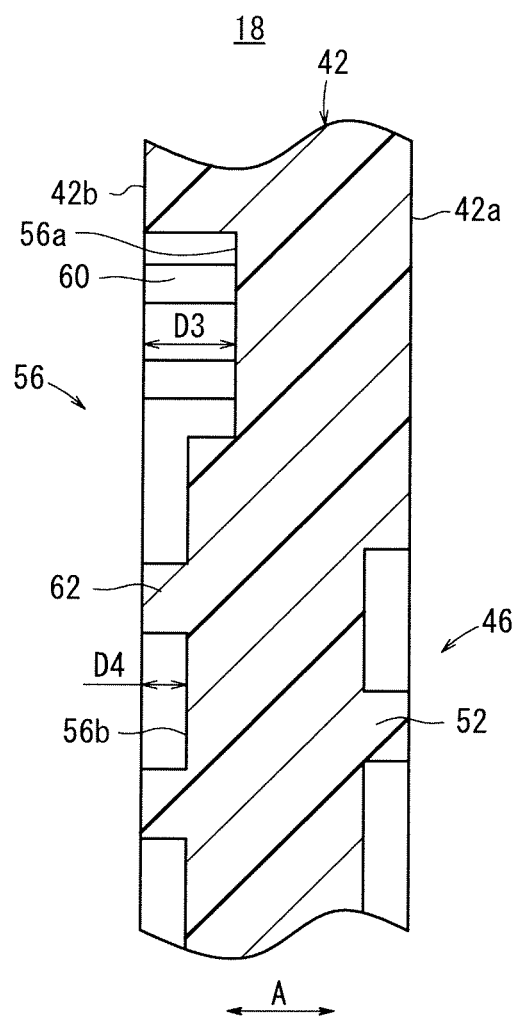
FIG. 5 is a cross sectional view showing the resin frame member, taken along a line V-V in FIG. 1.

As shown in FIG. 5, the depth (dimension of the opening) D3 of the first buffer area 56a from the surface 42b in the stacking direction indicated by the arrow A is larger than the depth (dimension of the opening) D4 of the second buffer area 56b in the stacking direction, i.e., the grooves of the first buffer area 56a are deeper than the grooves of the second buffer area 56b (D3>D4). Bosses 60 are formed in the first buffer area 56a, and a plurality of guides 62 connecting the first buffer area 56a and the fuel gas flow field 32 continuously are provided in the second buffer area 56b. As shown in FIG. 1, the guides 62 are thin plates that are arranged in parallel to each other at substantially equal intervals in the width direction of the fuel gas flow field 32 indicated by the arrow B.

The outlet buffer 58 has a substantially triangular shape, and includes a first buffer area 58a adjacent to the fuel gas discharge passage 22b and a second buffer area 58b adjacent to the fuel gas flow field 32. The first buffer area 58a is in parallel to the inner end surface of the fuel gas discharge passage 22b. The first buffer area 58a is elongated in the direction in which the outlet connection grooves 54b are arranged.

The grooves of the first buffer area 58a are deeper than the grooves of the second buffer area 58b. Bosses 60 are formed in the first buffer area 58a, and a plurality of guides 62 connecting the first buffer area 58a and the fuel gas flow field 32 continuously are provided in the second buffer area 58b.

A seal member 64 is formed on both surfaces 42a, 42b of the resin frame member 42, e.g., by injection molding. For example, the seal member 64 is made of seal material, cushion material, or packing material such as an EPDM (Ethylene Propylene Diene Monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 3, on the surface 42a, the seal member 64 is formed around the oxygen-containing gas supply passage 20a, the oxygen-containing gas discharge passage 20b, and the oxygen-containing gas flow field 26, while allowing the oxygen-containing gas supply passage 20a and the oxygen-containing gas discharge passage 20b to be connected to the oxygen-containing gas flow field 26. Further, on the surface 42a, the seal members 64 are formed around the fuel gas supply passage 22a, the fuel gas discharge passage 22b, the coolant supply passage 24a, and the coolant discharge passage 24b separately.

As shown in FIG. 1, on the surface 42b, the seal member 64 is formed around the fuel gas supply passage 22a, the fuel gas discharge passage 22b, and the fuel gas flow field 32 while allowing the fuel gas supply passage 22a and the fuel gas discharge passage 22b to be connected to the fuel gas flow field 32. Further, on the surface 42b, the seal member 64 are formed around the oxygen-containing gas supply passage 20a, the oxygen-containing gas discharge passage 20b, the coolant supply passage 24a, and the coolant discharge passage 24b, separately.

Operation of the fuel cell 10 will be described below.

Firstly, as shown in FIG. 1, an oxygen-containing gas is supplied to the oxygen-containing gas supply passage 20a, and a fuel gas such as a hydrogen-containing gas is supplied to the fuel gas supply passage 22a. Further, pure water, ethylene glycol, oil or the like is supplied to the coolant supply passage 24a.

Thus, as shown in FIG. 3, the oxygen-containing gas from the oxygen-containing gas supply passage 20a flows through the inlet connection grooves 44a formed in the resin frame member 42 of the membrane electrode assembly 18 into the inlet buffer 46. Then, the oxygen-containing gas is supplied from the inlet buffer 46 into the oxygen-containing gas flow field 26 of the first separator 14 (see FIG. 1). The oxygen-containing gas moves along the oxygen-containing gas flow field 26 in the direction indicated by the arrow C (in the direction of gravity), and the oxygen-containing gas is supplied to the cathode 38 of the membrane electrode assembly 18 for inducing an electrochemical reaction at the cathode 38.

In the meanwhile, as shown in FIG. 1, the fuel gas from the fuel gas supply passage 22a flows through the inlet connection grooves 54a formed in the resin frame member 42 of the membrane electrode assembly 18 into the inlet buffer 56. Then, the fuel gas is supplied from the inlet buffer 56 into the fuel gas flow field 32 of the second separator 16 in the direction of gravity indicated by the arrow C, and the fuel gas is supplied to the anode 40 of the membrane electrode assembly 18 for inducing an electrochemical reaction at the anode 40.

Thus, in the membrane electrode assembly 18, the oxygen-containing gas supplied to the cathode 38, and the fuel gas supplied to the anode 40 are consumed in the electrochemical reactions at catalyst layers of the cathode 38 and the anode 40 for generating electricity.

Then, the oxygen-containing gas consumed at the cathode 38 of the membrane electrode assembly 18 flows from the outlet buffer 48 through the outlet connection grooves 44b, and the oxygen-containing gas is discharged into the oxygen-containing gas discharge passage 20b (see FIG. 3). Further, as shown in FIG. 1, the fuel gas consumed at the anode 40 of the membrane electrode assembly 18 flows from the outlet buffer 58 through the outlet connection grooves 54b, and the fuel gas is discharged into the fuel gas discharge passage 22b.

As shown in FIG. 1, the coolant supplied to the coolant supply passage 24a flows into the coolant flow field 28 formed between the first separator 14 and the second separator 16, and then, flows in the direction indicated by the arrow B. After the coolant cools the membrane electrode assembly 18, the coolant is discharged into the coolant discharge passage 24b.

In the first embodiment, as shown in FIG. 3, the inlet buffer 46 is provided adjacent to the oxygen-containing gas supply passage 20a on the surface 42a of the resin frame member 42. The inlet buffer 46 includes the first buffer area 46a adjacent to the oxygen-containing gas supply passage 20a and the second buffer area 46b adjacent to the oxygen-containing gas flow field 26. The depth D1 of the first buffer area 46a in the stacking direction is larger than the depth D2 of the second buffer area 46b in the stacking direction. That is, the grooves of the first buffer area 46a are deeper than the grooves of the second buffer area 46b (see FIG. 4).

Thus, the oxygen-containing gas supplied from the oxygen-containing gas supply passage 20a to the inlet buffer 46 is distributed uniformly from the first buffer area 46a to the second buffer area 46b. Then, the oxygen-containing gas is supplied to the oxygen-containing gas flow field 26.

Further, in the second buffer area 46b, the guides 52 connecting the first buffer area 46a and the oxygen-containing gas flow field 26 continuously are provided. In the structure, the oxygen-containing gas flows smoothly in the second buffer area 46b.

Thus, after the oxygen-containing gas is supplied and distributed uniformly from the first buffer area 46a to the second buffer area 46b, the oxygen-containing gas is supplied to the entire oxygen-containing gas flow field 26 uniformly and reliably over the width direction indicated by the arrow B.

The outlet buffer 48 is provided adjacent to the oxygen-containing gas discharge passage 20b on the surface 42a of the resin frame member 42. The outlet buffer 48 includes the first buffer area 48a adjacent to the oxygen-containing gas discharge passage 20b and the second buffer area 48b adjacent to the oxygen-containing gas flow field 26. The grooves of the first buffer area 48a are deeper than the grooves of the second buffer area 48b.

In the structure, after the oxygen-containing gas moves from the oxygen-containing gas flow field 26 through the second buffer area 48b into the first buffer area 48a smoothly and uniformly, the oxygen-containing gas flows through the first buffer area 48a, and the oxygen-containing gas is discharged into the oxygen-containing gas discharge passage 20b. Thus, uniform distribution of the oxygen-containing gas is achieved over the entire power generation area of the oxygen-containing gas flow field 26.

Further, as shown in FIGS. 1 and 5, the inlet buffer 56 is provided adjacent to the fuel gas supply passage 22a on the surface 42b of the resin frame member 42. The inlet buffer 56 includes the first buffer area 56a adjacent to the fuel gas supply passage 22a and the second buffer area 56b adjacent to the fuel gas flow field 32. The depth D3 of the first buffer area 56a in the stacking direction is larger than the depth D4 of the second buffer area 56b in the stacking direction. That is, the grooves of the first buffer area 56a are deeper than the grooves of the second buffer area 56b (see FIG. 5).

Thus, the fuel gas supplied from the fuel gas supply passage 22a to the inlet buffer 56 is distributed uniformly from the first buffer area 56a to the second buffer area 56b, and then, the fuel gas is supplied to the fuel gas flow field 32.

Further, the guides 62 connecting first buffer area 56a and the fuel gas flow field 32 continuously are provided in the second buffer area 56b. Thus, the fuel gas flows smoothly in the second buffer area 56b.

In the structure, after the fuel gas is supplied and distributed uniformly from the first buffer area 56a to the second buffer area 56b, the fuel gas is supplied to the entire fuel gas flow field 32 uniformly and reliably over the width direction indicated by the arrow B.

The outlet buffer 58 is provided adjacent to the fuel gas discharge passage 22b on the surface 42b of the resin frame member 42. The outlet buffer 58 includes the first buffer area 58a adjacent to the fuel gas discharge passage 22b and the second buffer area 58b adjacent to the fuel gas flow field 32.

The grooves of the first buffer area 58a are deeper than the grooves of the second buffer area 58b.

In the structure, after the fuel gas moves from the fuel gas flow field 32 through the second buffer area 58b into the first buffer area 58a smoothly and uniformly, the fuel gas flows through the first buffer area 58a, and the fuel gas is discharged into the fuel gas discharge passage 22b. Thus, uniform distribution of the fuel gas is achieved in the entire power generation area of the fuel gas flow field 32.

Therefore, the oxygen-containing gas and the fuel gas can be supplied uniformly and reliably to the entire oxygen-containing gas flow field 26 formed in the first separator 14 and the entire fuel gas flow field 32 formed in the second separator 16. Accordingly, with the simple structure, a desired power generation performance of the fuel cell 10 can be maintained advantageously.

Further, in the first embodiment, the inlet buffer 46 and the outlet buffer 48 for the oxygen-containing gas are formed on the surface 42a of the resin frame member 42, and the inlet buffer 56 and the outlet buffer 58 for the fuel gas are formed on the surface 42b of the resin frame member 42.

Since the resin frame member 42 is used, the front and back surfaces (surfaces 42a, 42b) can have different shapes. That is, the shapes of the inlet buffer 46 and the outlet buffer 48 and the shapes of the inlet buffer 56 and the outlet buffer 58 can be determined separately and easily as desired, respectively, without any mutual interferences. Therefore, for example, the straight guides or the bosses may be formed, or both of the straight guides and the bosses may be formed in combination as necessary, in the surfaces 42a, 42b.

It should be noted that only the inlet buffer 46 and the outlet buffer 48 for the oxygen-containing gas may be provided in the resin frame member 42, or only the inlet buffer 56 and the outlet buffer 58 for the fuel gas may be provided in the resin frame member 42. Also in the second embodiment to be described later, only the inlet buffer and the outlet buffer for the oxygen-containing gas may be provided in the resin frame member, or only the inlet buffer and the outlet buffer for the fuel gas may be provided in the resin frame member.

Figure 6:
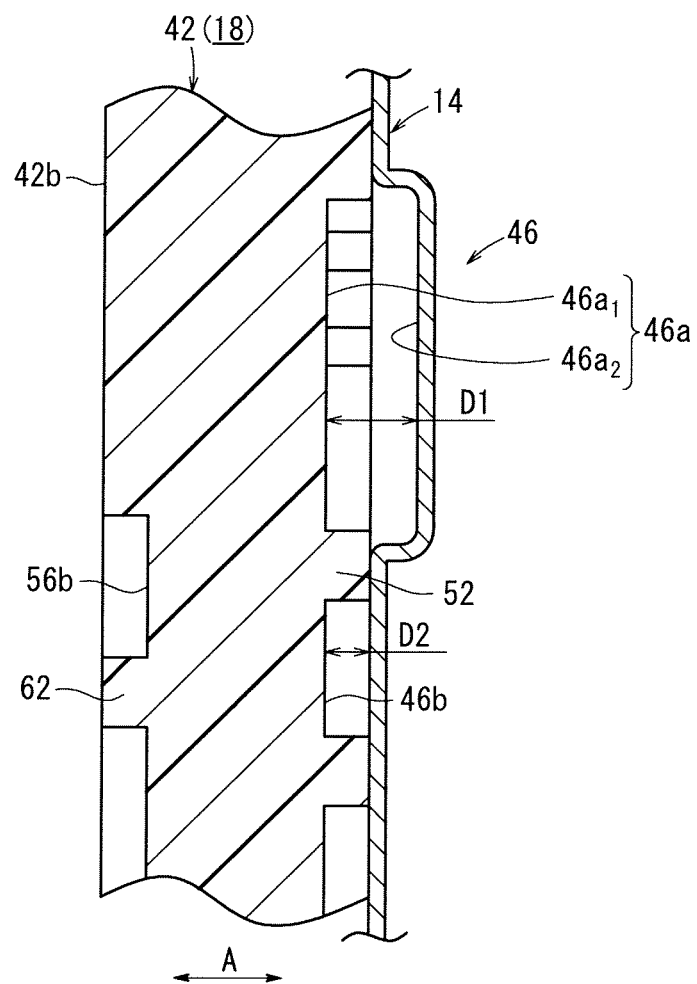
FIG. 6 is a cross sectional view showing an inlet buffer having another structure.

In the first embodiment, the first buffer area 46a and the second buffer area 46b of the inlet buffer 46 are provided only in the resin frame member 42. However, the present invention is not limited in this respect. That is, it is sufficient that the first buffer area 46a and the second buffer area 46b are provided substantially between the resin frame member 42 and the first separator 14. For example, in FIG. 6, a buffer area 46a1 is provided on the resin frame member 42 side, and a buffer area 46a2 forming a recess in a direction spaced from the buffer area 46a1 is provided on the first separator 14 side.

The first buffer area 46a is formed by combination of the buffer area 46a1 and the buffer area 46a2 to obtain the depth D1 as the opening dimension in the stacking direction. The depth of the buffer area 46a1 may be the same as the depth D2 of the second buffer area 46b such that the buffer area 46a1 and the second buffer area 46b are in the same plane.

Further, as in the case of the inlet buffer 46, in the outlet buffer 48, the first buffer area 48a may be provided by increasing the opening dimension in the stacking direction, and the second buffer area 48b may be provided by decreasing the opening dimension in the stacking direction, between the resin frame member 42 and the first separator 14.

Further, the inlet buffer 56 and the outlet buffer 58 may have the same structure as described above. Moreover, the second and other embodiments to be described later may have the same structure as described above.

Figure 7:
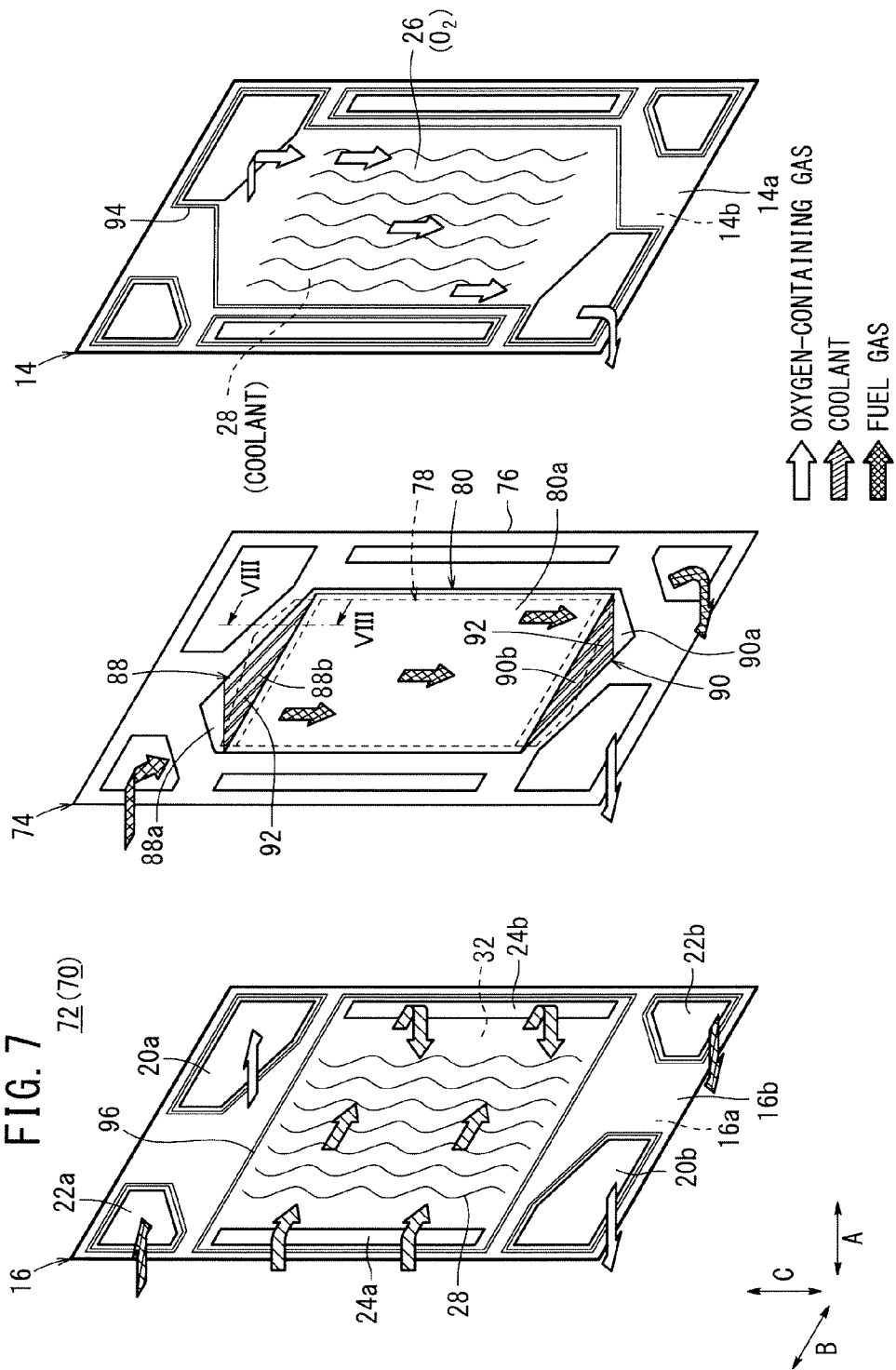
FIG. 7 is an exploded perspective view showing a cell unit of a fuel cell according to a second embodiment of the present invention.

FIG. 7 is an exploded perspective view showing a cell unit 72 of a fuel cell 70 according to a second embodiment of the present invention. The constituent elements that are identical to those of the fuel cell 10 according to the first embodiment are labeled with the same reference numerals, and descriptions thereof will be omitted.

Figure 8:
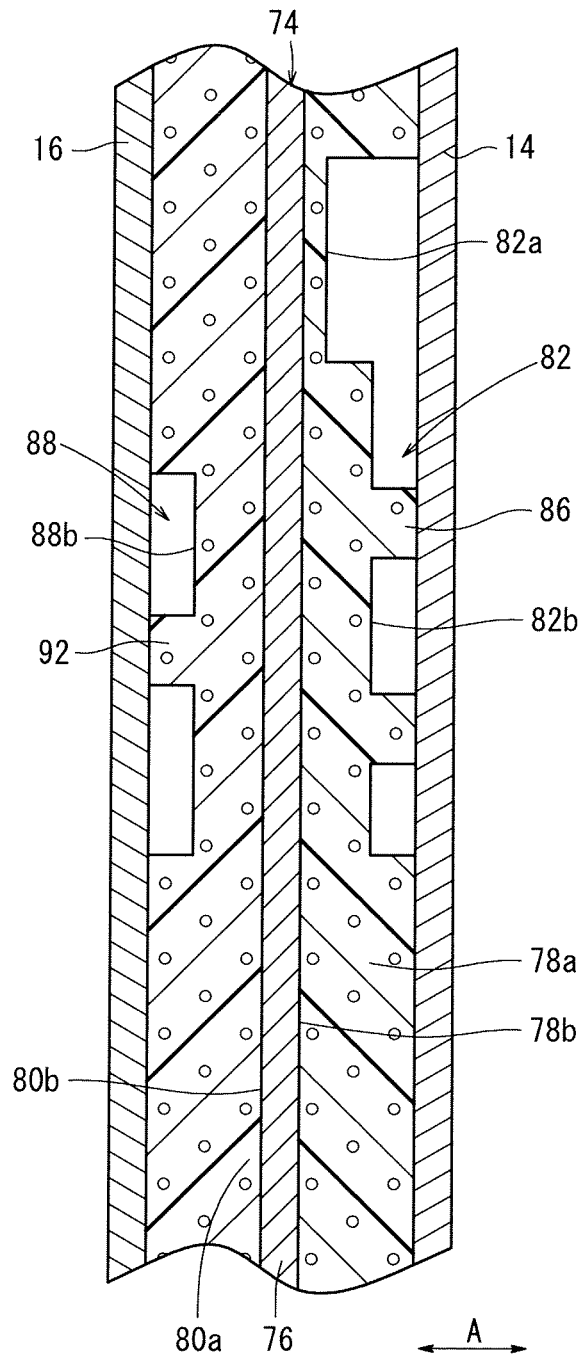
FIG. 8 is a cross sectional view showing the cell unit, taken along a line VIII-VIII in FIG. 7.

The cell unit 72 includes a membrane electrode assembly (MEA) 74, and a first separator 14 and a second separator 16 sandwiching the membrane electrode assembly 74. As shown in FIGS. 7 and 8, the membrane electrode assembly 74 includes a cathode 78, an anode 80, and a solid polymer electrolyte membrane 76 interposed between the cathode 78 and the anode 80.

Each of the cathode 78 and the anode 80 has a gas diffusion layer 78a, 80a such as a carbon paper, and an electrode catalyst layer 78b, 80b of platinum alloy supported on porous carbon particles. The carbon particles are deposited uniformly on the surface of the gas diffusion layer 78a, 80a. The electrode catalyst layer 78b of the cathode 78 and the electrode catalyst layer 80b of the anode 80 are fixed to both surfaces of the solid polymer electrolyte membrane 76, respectively.

As shown in FIG. 8, an inlet buffer 82 and an outlet buffer 84 are formed in the gas diffusion layer 78a of the cathode 78. The inlet buffer 82 includes a first buffer area 82a adjacent to the oxygen-containing gas supply passage 20a and a second buffer area 82b adjacent to the oxygen-containing gas flow field 26. The depth of the first buffer area 82a in the stacking direction is larger than the depth of the second buffer area 82b in the stacking direction. That is, the grooves of the first buffer area 82a are deeper than the grooves of the second buffer area 82b (see FIG. 8).

Though the first buffer area 82a forms an empty space, bosses may be provided in the first buffer area 82a as necessary. A plurality of guides 86 connecting the first buffer area 82a and the oxygen-containing gas flow field 26 continuously are provided in the second buffer area 82b.

Figure 9:
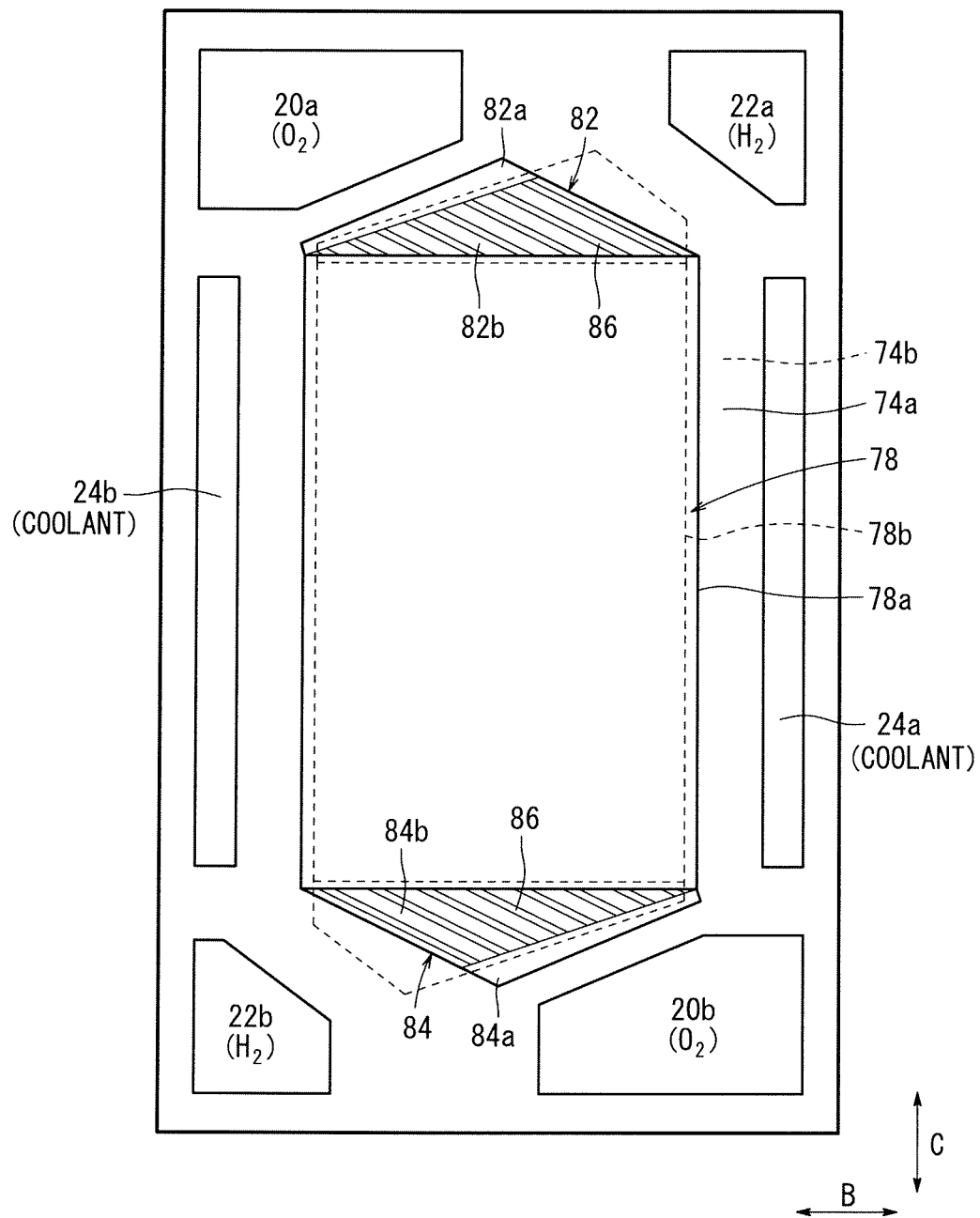
FIG. 9 is a front view showing a membrane electrode assembly of the cell unit.

As shown in FIG. 9, the outlet buffer 84 includes a first buffer area 84a adjacent to the oxygen-containing gas discharge passage 20b and a second buffer area 84b adjacent to the oxygen-containing gas flow field 26. The grooves of the first buffer area 84a are deeper than the grooves of the second buffer area 84b. A plurality of guides 86 connecting the first buffer area 84a and the oxygen-containing gas flow field 26 continuously are provided in the second buffer area 84b.

As shown in FIG. 7, an inlet buffer 88 and an outlet buffer 90 are formed in the gas diffusion layer 80a of the anode 80. The inlet buffer 88 includes a first buffer area 88a adjacent to the fuel gas supply passage 22a and a second buffer area 88b adjacent to the fuel gas flow field 32. The depth of the first buffer area 88a in the stacking direction is larger than the depth of the second buffer area 88b in the stacking direction. That is, the grooves of the first buffer area 88a are deeper than the grooves of the second buffer area 88b. A plurality of guides 92 connecting the first buffer area 88a and the fuel gas flow field 32 continuously are provided in the second buffer area 88b.

The outlet buffer 90 includes a first buffer area 90a adjacent to the fuel gas discharge passage 22b and a second buffer area 90b adjacent to the fuel gas flow field 32. The grooves of the first buffer area 90a are deeper than the grooves of the second buffer area 90b. A plurality of guides 92 connecting the first buffer area 90a and the fuel gas flow field 32 continuously are provided in the second buffer area 90b.

A first seal member 94 is formed integrally with both surfaces 14a, 14b of the first separator 14, e.g., by injection molding. A second seal member 96 is formed integrally with both surfaces 16a, 16b of the second separator 16, e.g., by injection molding. The first seal member 94 and the second seal member 96 have the same structure as the seal member 64 used in the first embodiment.

In the second embodiment, the gas diffusion layer 78a has the inlet buffer 82 and the outlet buffer 84 for the oxygen-containing gas, and the gas diffusion layer 80a has the inlet buffer 88 and the outlet buffer 90 for the fuel gas.

In the structure, the same advantages as in the cases of the first embodiment are obtained. For example, the oxygen-containing gas and the fuel gas can be supplied to the entire oxygen-containing gas flow field 26 and the entire fuel gas flow field 32 uniformly and reliably, and with the simple structure, a desired power generation performance of the fuel cell 70 can be maintained.

Figure 10:
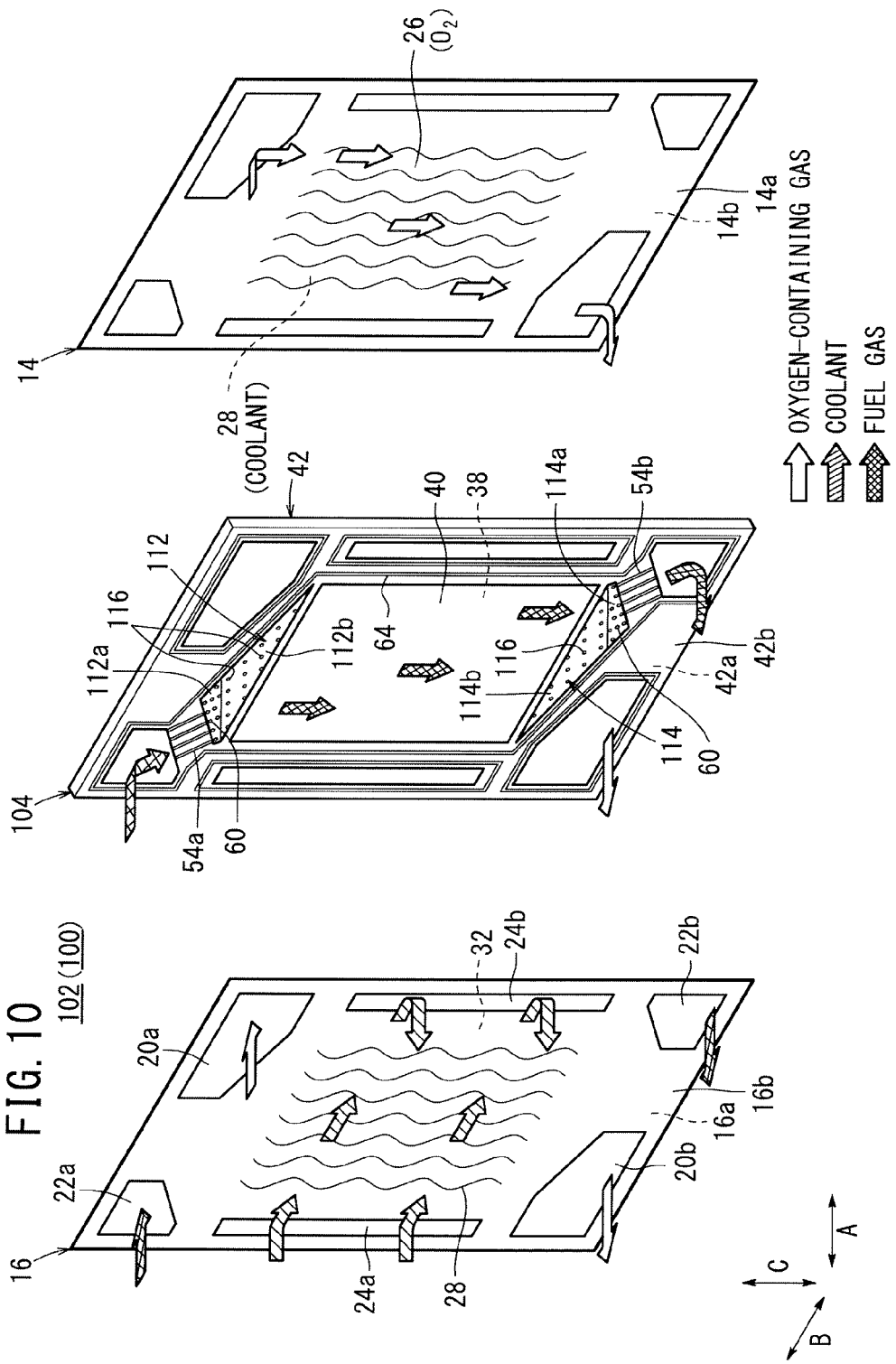
FIG. 10 is an exploded perspective view showing a cell unit of a fuel cell according to a third embodiment of the present invention.

FIG. 10 is an exploded perspective view showing a cell unit 102 of a fuel cell 100 according to a third embodiment of the present invention. The constituent elements that are identical to those of the fuel cell 10 according to the first embodiment are labeled with the same reference numerals, and descriptions thereof will be omitted.

Figure 11:
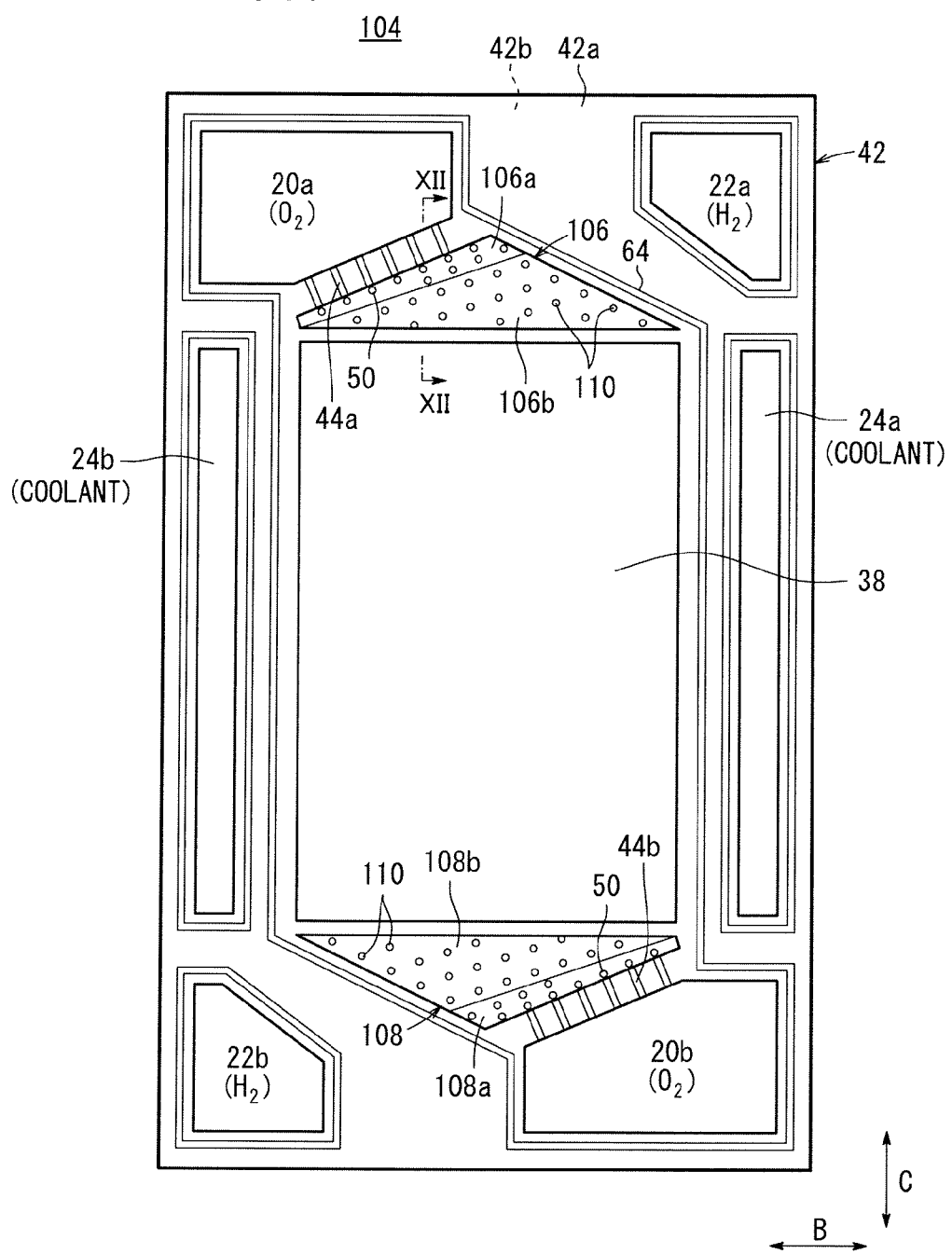
FIG. 11 is a front view showing a membrane electrode assembly of the cell unit.

The cell unit 102 includes a membrane electrode assembly (MEA) 104, and a first separator 14 and a second separator 16 sandwiching the membrane electrode assembly (MEA) 104. As shown in FIG. 11, an inlet buffer 106 and an outlet buffer 108 are formed on a surface 42a of the resin frame member 42 of the membrane electrode assembly 104.

Figure 12:
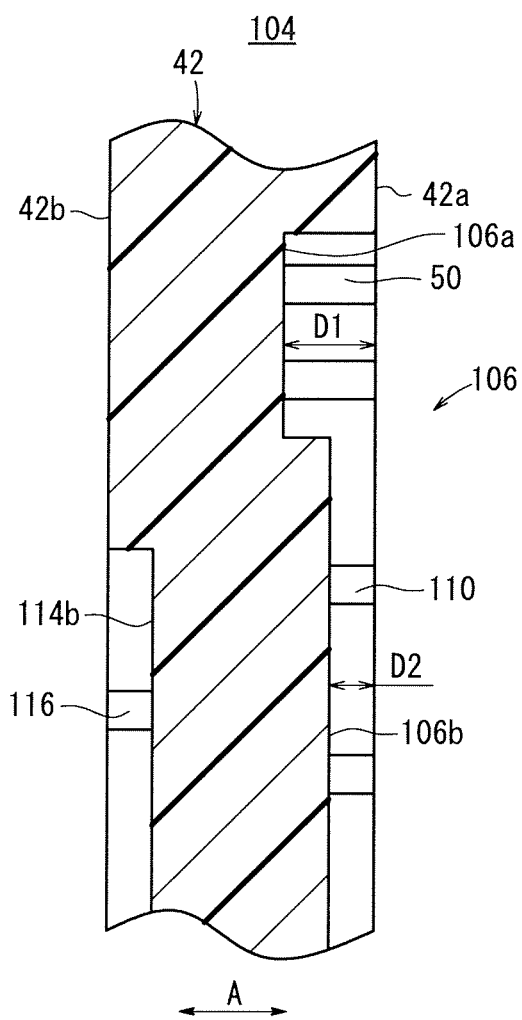
FIG. 12 is a cross sectional view showing a resin frame member provided in the membrane electrode assembly, taken along a line XII-XII in FIG. 11.

The inlet buffer 106 includes a first buffer area 106a adjacent to the oxygen-containing gas supply passage 20a and a second buffer area 106b adjacent to the oxygen-containing gas flow field 26. The depth D1 of the first buffer area 106a in the stacking direction is larger than the depth D2 of the second buffer area 106b in the stacking direction. That is, the grooves of the first buffer area 106a are deeper than the grooves of the second buffer area 106b (see FIG. 12). Bosses 110 are formed in the second buffer area 106b.

The outlet buffer 108 includes a first buffer area 108a adjacent to the oxygen-containing gas discharge passage 20b and a second buffer area 108b adjacent to the oxygen-containing gas flow field 26. The grooves of the first buffer area 108a are deeper than the grooves of the second buffer area 108b, and bosses 110 are formed in the second buffer area 108b.

As shown in FIG. 10, the inlet buffer 112 and the outlet buffer 114 are formed on the surface 42b of the resin frame member 42 of the membrane electrode assembly 104. The inlet buffer 112 includes a first buffer area 112a adjacent to the fuel gas supply passage 22a and a second buffer area 112b adjacent to the fuel gas flow field 32. The grooves of the first buffer area 112a are deeper than the grooves of the second buffer area 112b, and bosses 116 are formed in the second buffer area 112b.

The outlet buffer 114 includes a first buffer area 114a adjacent to the fuel gas discharge passage 22b and a second buffer area 114b adjacent to the fuel gas flow field 32. The grooves of the first buffer area 114a are deeper than the grooves of the second buffer area 114b. Bosses 116 are formed in the second buffer area 114b.

In the third embodiment, as shown in FIG. 11, the inlet buffer 106 includes the first buffer area 106a having deep grooves and the second buffer area 106b having shallow grooves. The bosses 50 and 110 are formed in the first buffer area 106a and the second buffer area 106b, respectively.

Therefore, the oxygen-containing gas supplied from the oxygen-containing gas supply passage 20a to the inlet buffer 106 is diffused (dispersed) suitably from the first buffer area 106a to the second buffer area 106b, and then, the oxygen-containing gas is supplied to the oxygen-containing gas flow field 26.

Thus, after the oxygen-containing gas is supplied and diffused from the first buffer area 106a to the second buffer area 106b, the oxygen-containing gas is supplied reliably to the entire oxygen-containing gas flow field 26 over the width direction indicated by the arrow B advantageously. It is advantageous particularly in the case where the inlet buffer 106 has a shape which requires dispersion of the gas.

Also in the outlet buffer 108, the same advantages are obtained. Likewise, also in the fuel gas flow field 32, the inlet buffer 112 and the outlet buffer 114 are provided, and the fuel gas can be supplied and dispersed suitably.

Figure 13:
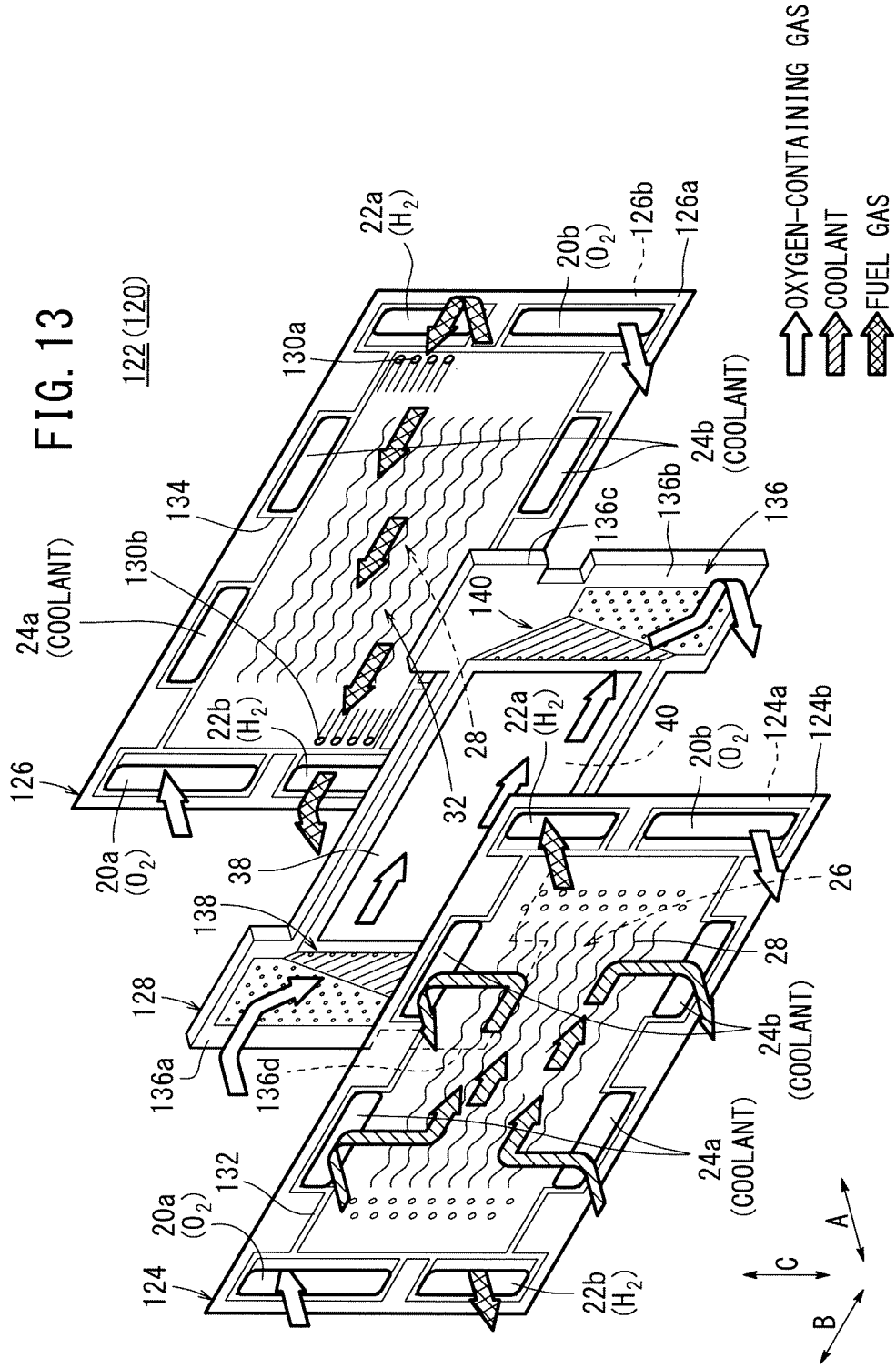
FIG. 13 is an exploded perspective view showing a cell unit of a fuel cell according to a fourth embodiment of the present invention.

FIG. 13 is an exploded perspective view showing a cell unit 122 of a fuel cell 120 according to a fourth embodiment of the present invention. The constituent elements that are identical to those of the fuel cell 10 according to the first embodiment are labeled with the same reference numerals, and descriptions thereof will be omitted.

The cell unit 122 includes a membrane electrode assembly 128, and a first separator 124 and a second separator 126 sandwiching the membrane electrode assembly 128. At one end of the cell unit 122 in the longitudinal direction indicated by the arrow B, an oxygen-containing gas supply passage 20a and a fuel gas discharge passage 22b are provided. At the other end of the cell unit 122 in the longitudinal direction, a fuel gas supply passage 22a and an oxygen-containing gas discharge passage 20b are provided.

At both ends of the cell unit 122 in the lateral direction indicated by the arrow C, a pair of coolant supply passages 24a are provided on one side adjacent to the oxygen-containing gas supply passage 20a. At both ends of the cell unit 122 in the lateral direction, a pair of coolant discharge passages 24b are provided on the other side adjacent to the fuel gas supply passage 22a.

The first separator 124 has an oxygen-containing gas flow field 26 on its surface 124a facing the membrane electrode assembly 128. A coolant flow field 28 is partially formed on a surface 124b of the first separator 124. The second separator 126 has a fuel gas flow field 32 on its surface 126a facing the membrane electrode assembly 128, and the coolant flow field 28 is partially formed on a surface 126b of the second separator 126.

The second separator 126 has a plurality of supply holes 130a adjacent to the fuel gas supply passage 22a and a plurality of discharge holes 130b adjacent to the fuel gas discharge passage 22b. The supply holes 130a are connected to the fuel gas supply passage 22a on the surface 126b side, and connected to the fuel gas flow field 32 on the surface 126a side. Likewise, the discharge holes 130b are connected to the fuel gas discharge passage 22b on the surface 126b side, and connected to the fuel gas flow field 32 on the surface 126a side.

A first seal member 132 is formed integrally with the surfaces 124a, 124b of the first separator 124, around the outer circumferential end of the first separator 124. A second seal member 134 is formed integrally with the surfaces 126a, 126b of the second separator 126, around the outer circumferential end of the second separator 126.

Figure 14:
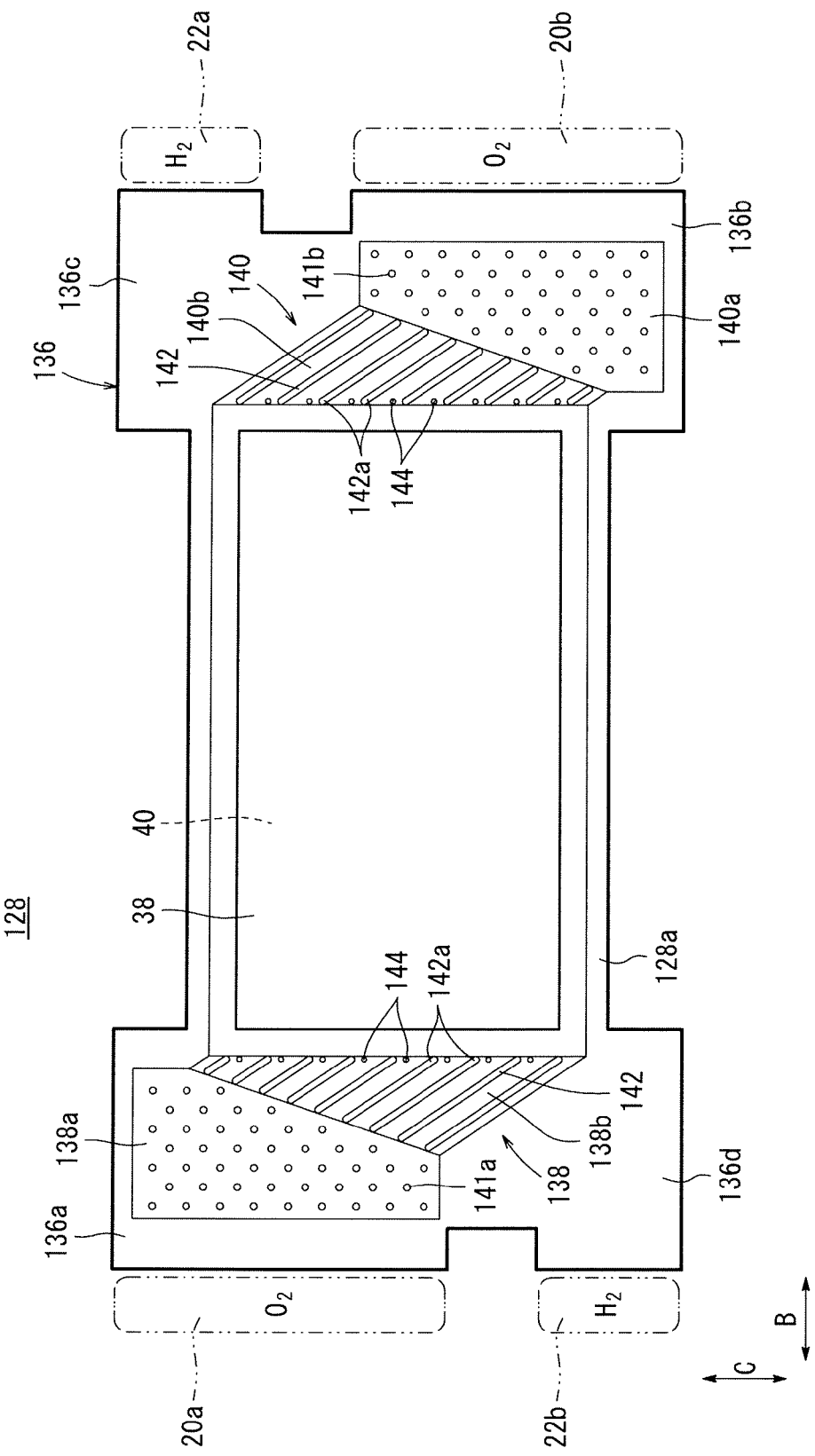
FIG. 14 is a view showing one surface of a membrane electrode assembly of the cell unit.
Figure 15:
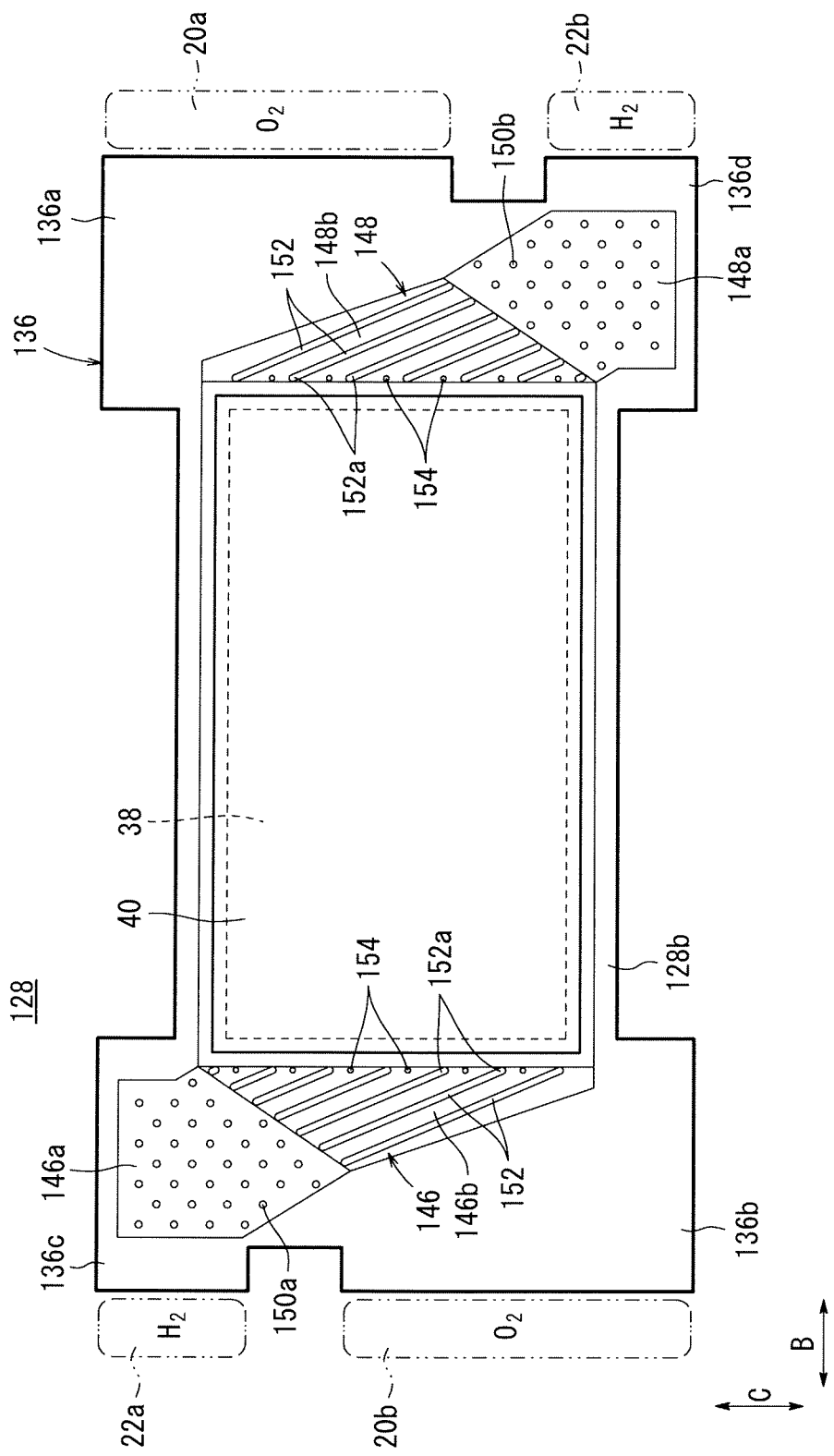
FIG. 15 is a view showing the other surface of the membrane electrode assembly.

The membrane electrode assembly 128 includes a resin frame member 136. As shown in FIGS. 13 to 15, at both ends in the longitudinal direction indicated by the arrow B, the resin frame member 136 includes extensions 136a, 136b protruding respectively toward the oxygen-containing gas supply passage 20a and the oxygen-containing gas discharge passage 20b, and extensions 136c, 136d protruding respectively toward the fuel gas supply passage 22a and the fuel gas discharge passage 22b.

The end surfaces of the extensions 136a, 136b are in parallel with the inner wall surface of oxygen-containing gas supply passage 20a and the inner wall surface of the oxygen-containing gas discharge passage 20b. The end surfaces of the extensions 136c, 136d are in parallel with the inner wall surface of the fuel gas supply passage 22a and the inner wall surface of the fuel gas discharge passage 22b.

As shown in FIG. 14, an inlet buffer 138 and an outlet buffer 140 are provided on a surface 128a of the resin frame member 136 where the cathode 38 is provided. The inlet buffer 138 includes a first buffer area 138a adjacent to the oxygen-containing gas supply passage 20a and a second buffer area 138b adjacent to the oxygen-containing gas flow field 26.

The grooves of the first buffer area 138a are deeper than the grooves of the second buffer area 138b. The first buffer area 138a is in parallel to the inner end surface of the oxygen-containing gas supply passage 20a, and bosses 141a are formed in the first buffer area 138a.

A plurality of guides 142 connecting the first buffer area 138a and the oxygen-containing gas flow field 26 continuously are provided in the second buffer area 138b. The guides 142 are inclined downward from the first buffer area 138a to the oxygen-containing gas flow field 26, and arranged in parallel to each other at equal intervals.

Figure 16:
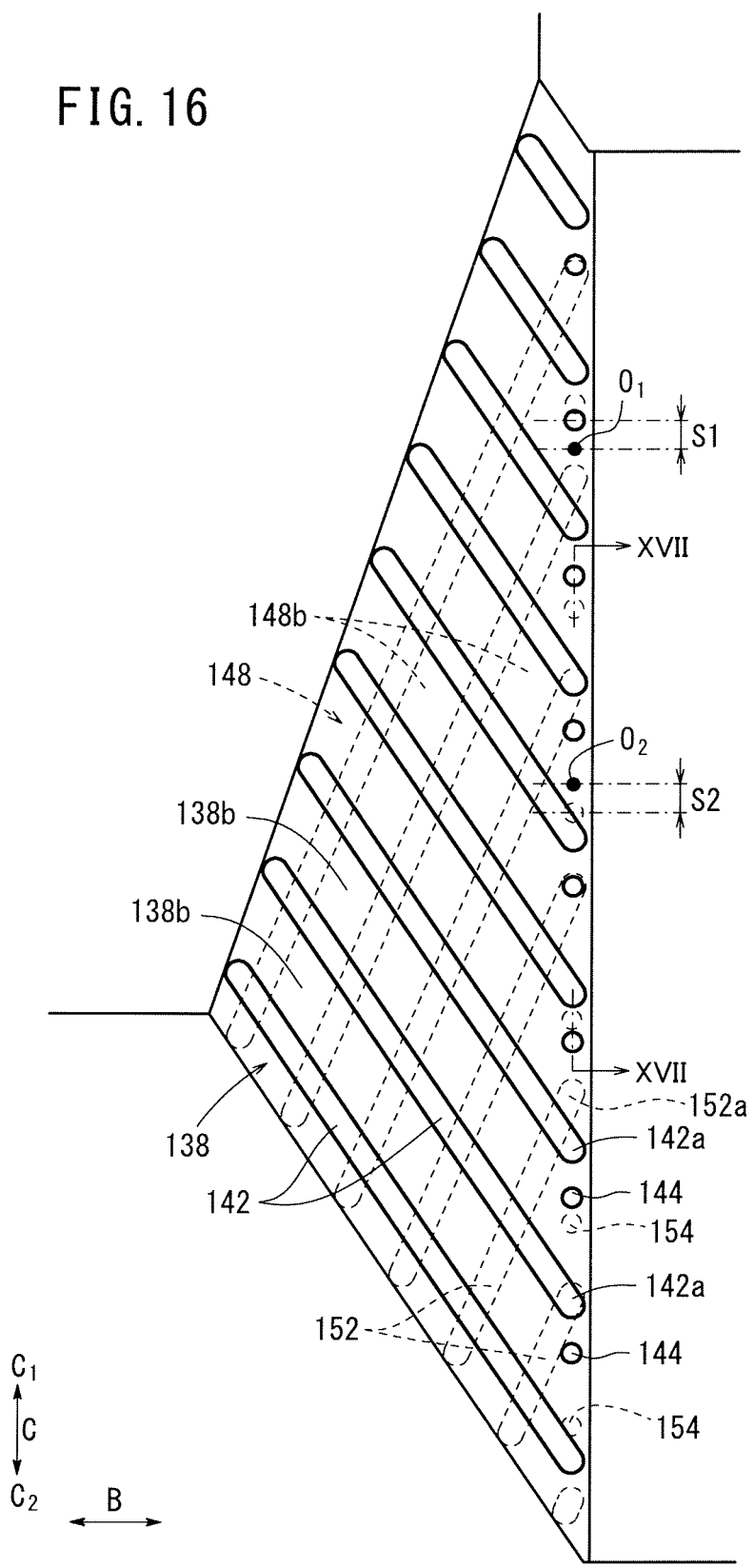
FIG. 16 is a view showing an inlet buffer of a resin frame member of the membrane electrode assembly.
Figure 17:
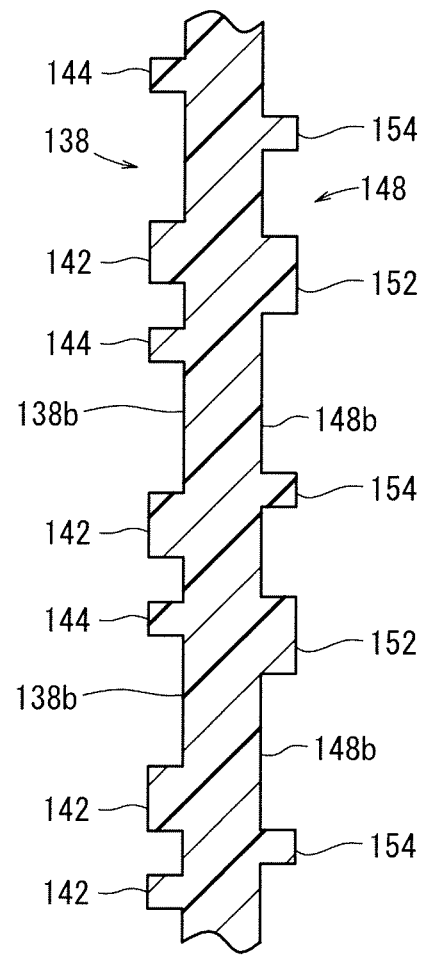
FIG. 17 is a cross sectional view showing the resin frame member, taken along a line XVII-XVII in FIG. 16.
Figure 18:
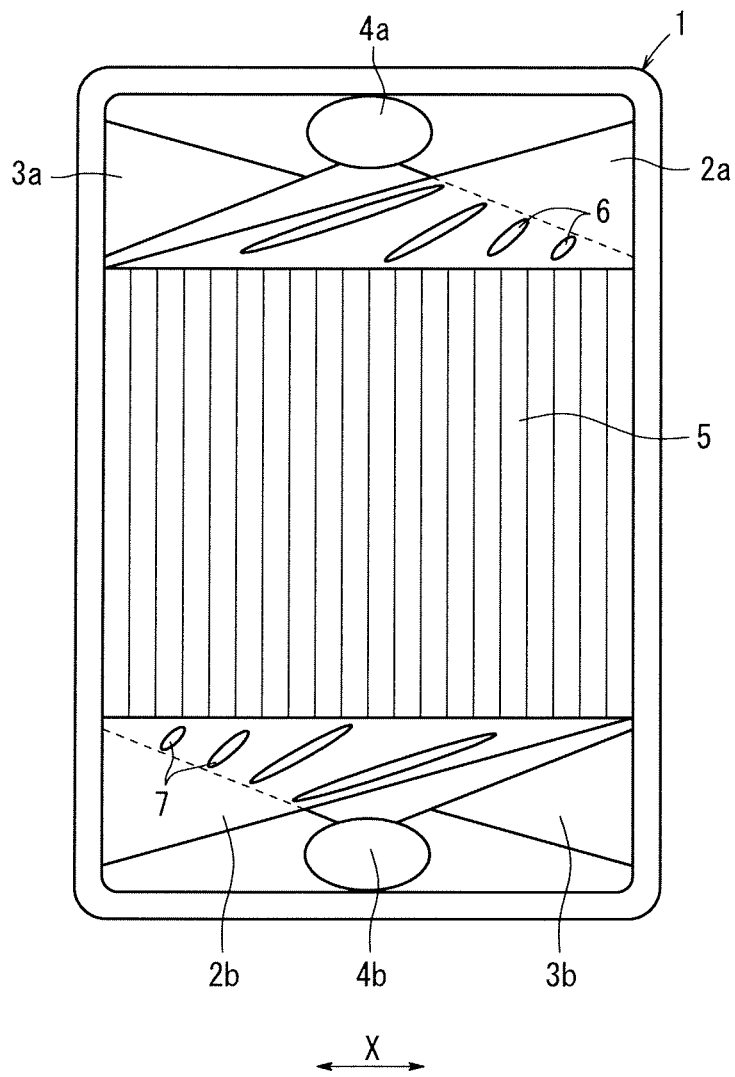
FIG. 18 is a view showing a fuel cell disclosed in the conventional technique 1.

As shown in FIG. 16, each of the guides 142 has an end 142a which is terminated at a position adjacent to the oxygen-containing gas flow field 26. A central position O1 is determined between the adjacent ends 142a. Projections 144 for preventing deformation are provided between the ends 142a, each projection 144 being located at a position offset from the central position O1 by a distance S1 in a direction (indicated by an arrow C1) in which the guides 142 are inclined relative to the flow direction (indicated by an arrow B) of the oxygen-containing gas flow field 26. The projection 144 has a cylindrical shape, and has the same height as the guides 142 (see FIG. 17). The end surface of the projections 144 are aligned with the end surfaces of the guides 142 (see FIG. 16).

As shown in FIG. 14, the outlet buffer 140 includes a first buffer area 140a adjacent to the oxygen-containing gas discharge passage 20b and a second buffer area 140b adjacent to the oxygen-containing gas flow field 26. The grooves of the first buffer area 140a are deeper than the grooves of the second buffer area 140b. The first buffer area 140a is in parallel with the inner end surface of the oxygen-containing gas discharge passage 20b, and bosses 141b are formed in the first buffer area 140a.

A plurality of guides 142 connecting the first buffer area 140a and the oxygen-containing gas flow field 26 continuously are provided in the second buffer area 140b. The guides 142 are inclined upward from the first buffer area 140a to the oxygen-containing gas flow field 26, and arranged in parallel to each other at equal intervals. Projections 144 are provided between the ends 142a of the guides 142.

As shown in FIG. 15, an inlet buffer 146 and an outlet buffer 148 are provided on a surface 128b of the resin frame member 136 where the anode 40 is provided. The inlet buffer 146 includes a first buffer area 146a adjacent to the fuel gas supply passage 22a and a second buffer area 146b adjacent to the fuel gas flow field 32.

The grooves of the first buffer area 146a are deeper than the grooves of the second buffer area 146b. The first buffer area 146a is in parallel to the inner end surface of the fuel gas supply passage 22a, and bosses 150a are formed in the first buffer area 146a.

A plurality of guides 152 connecting the first buffer area 146a and the fuel gas flow field 32 continuously are provided in the second buffer area 146b. The guides 152 are inclined downward from the first buffer area 146a to the fuel gas flow field 32, and arranged in parallel to each other at equal intervals. Projections 154 are provided between the ends 152a of the guides 152.

The outlet buffer 148 includes a first buffer area 148a adjacent to the fuel gas discharge passage 22b and a second buffer area 148b adjacent to the fuel gas flow field 32. The grooves of the first buffer area 148a are deeper than the grooves of the second buffer area 148b. The first buffer area 148a is in parallel to the inner end surface of the fuel gas discharge passage 22b, and bosses 150b are formed in the first buffer area 148a.

A plurality of guides 152 connecting the first buffer area 148a and the fuel gas flow field 32 continuously are provided in the second buffer area 148b. The guides 152 are inclined upward from the first buffer area 148a to the fuel gas flow field 32, and arranged in parallel to each other at equal intervals. Projections 154 are provided between ends 152a of the guides 152.

As shown in FIG. 16, each of the guides 152 has an end 152a terminated at a position adjacent to the fuel gas flow field 32. A central position O2 is determined between the adjacent ends 152a of the guides 152. Projections 154 for preventing deformation are provided between the ends 152a, each projection 154 being located at a position offset from the central position O2 by a distance S2 in a direction (indicated by an arrow C2) in which the guides 152 are inclined relative to the flow direction (indicated by an arrow B) of the fuel gas flow field 32. The projection 154 has a cylindrical shape, and has the same height as the guides 152 (see FIG. 17). The end surface of the projections 154 is aligned with the end surfaces of the guides 152.

In the fourth embodiment, the same advantages as in the cases of the first to third embodiments are obtained. Further, the number of the guides 142 for the oxygen-containing gas is different from the number of the guides 152 for the fuel gas, and the ends 142a of the guides 142 are offset from the ends 152a of the guides 152. Thus, since a relatively wide thin portion is present in the resin frame member 136, by providing the projections 144, 154, deformation in the resin frame member 136 can be suppressed advantageously.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell including a membrane electrode assembly and separators sandwiching the membrane electrode assembly, the membrane electrode assembly including a pair of electrodes and an electrolyte membrane interposed between the electrodes, a first reactant gas flow field being formed in the fuel cell for supplying one reactant gas along one electrode surface of the membrane electrode assembly, and a second reactant gas flow field being formed in the fuel cell for supplying the other reactant gas along the other electrode surface of the membrane electrode assembly, wherein a first reactant gas passage is formed for supplying the one reactant gas in a stacking direction of the fuel cell and a second reactant gas passage is formed for supplying the other reactant gas in the stacking direction;
a buffer connecting the first reactant gas passage and the first reactant gas flow field is provided at least on one surface of the membrane electrode assembly;
the buffer includes a first buffer area adjacent to the first reactant gas passage and a second buffer area adjacent to the first reactant gas flow field;
the opening dimension of the first buffer area in the stacking direction is larger than the opening dimension of the second buffer area in the stacking direction,
the buffer is formed on the resin frame member with a first side substantially parallel with a width of the first reactant gas passage, and a second side substantially parallel with a width of the reactant gas flow field, and
a width of the buffer on the second side is substantially the same as the width of the first reactant gas flow field.

2. A fuel cell including a membrane electrode assembly and separators sandwiching the membrane electrode assembly, the membrane electrode assembly including a pair of electrodes and an electrolyte membrane interposed between the electrodes, a first reactant gas flow field being formed in the fuel cell for supplying one reactant gas along one electrode surface of the membrane electrode assembly, and a second reactant gas flow field being formed in the fuel cell for supplying the other reactant gas along the other electrode surface of the membrane electrode assembly,
wherein:
a first reactant gas passage is formed for supplying the one reactant gas in a stacking direction of the fuel cell and a second reactant gas passage is formed for supplying the other reactant gas in the stacking direction;
a buffer connecting the first reactant gas passage and the first reactant gas flow field is provided at least on one surface of the membrane electrode assembly;
the buffer includes a first buffer area adjacent to the first reactant gas passage and a second buffer area adjacent to the first reactant gas flow field;
the opening dimension of the first buffer area in the stacking direction is larger than the opening dimension of the second buffer area in the stacking direction,
the electrode includes a gas diffusion layer, and
the buffer is formed on the gas diffusion layer.

3. The fuel cell according to claim 1, wherein a plurality of guides connecting the first buffer area and the first reactant gas flow field continuously are provided in the second buffer area.

4. A fuel cell including a membrane electrode assembly and separators sandwiching the membrane electrode assembly, the membrane electrode assembly including a pair of electrodes and an electrolyte membrane interposed between the electrodes, a first reactant gas flow field being formed in the fuel cell for supplying one reactant gas along one electrode surface of the membrane electrode assembly, and a second reactant gas flow field being formed in the fuel cell for supplying the other reactant gas along the other electrode surface of the membrane electrode assembly,
wherein a first reactant gas passage is formed for supplying the one reactant gas in a stacking direction of the fuel cell and a second reactant gas passage is formed for supplying the other reactant gas in the stacking direction;
a buffer connecting the first reactant gas passage and the first reactant gas flow field is provided at least on one surface of the membrane electrode assembly;
the buffer includes a first buffer area adjacent to the first reactant gas passage and a second buffer area adjacent to the first reactant gas flow field; and
the opening dimension of the first buffer area in the stacking direction is larger than the opening dimension of the second buffer area in the stacking direction,
and further wherein:
a plurality of guides connecting the first buffer area and the first reactant gas flow field continuously are provided in the second buffer area,
each of the guides has an end terminated at a position adjacent to the first reactant gas flow field, and a projection is provided between the adjacent ends, the projection being located at a position offset from a central position between the adjacent ends in a direction in which the guides are inclined relative to the flow direction of the first reactant gas flow field.

5. The fuel cell according to claim 1, wherein another buffer connecting the second reactant gas passage and the second reactant gas flow field is provided on the other surface of the membrane electrode assembly;
the other buffer includes a third buffer area adjacent to the second reactant gas passage, and a fourth buffer area adjacent to the second reactant gas flow field; and
the opening dimension of the third buffer area in the stacking direction is larger than the opening dimension of the fourth buffer area in the stacking direction.

6. The fuel cell according to claim 5, wherein a plurality of guides connecting the third buffer area and the second reactant gas flow field continuously are provided in the fourth buffer area.

7. The fuel cell according to claim 6, wherein each of the guides has an end terminated at a position adjacent to the second reactant gas flow field, and a projection is provided between the adjacent ends, the projection being located at a position offset from a central position between the adjacent ends in a direction in which the guides are inclined relative to the flow direction of the second reactant gas flow field.

8. The fuel cell according to claim 3 wherein:
the guides are thin plates that are arranged in parallel to each other substantially at equal intervals in the width direction of the reactant gas flow field, and distributed across the width of the reactant gas flow field.

* * * * *